United States Patent [19]

Lauterbach

[11] Patent Number: 5,236,466
[45] Date of Patent: Aug. 17, 1993

[54] FAST COOLING OF PARTIALLY SOLIDIFIED GRANULES OF LOW MELTING, SUBLIMING SUBSTANCES OBTAINED BY PRILLING

[75] Inventor: Armin Lauterbach, Antofagasta, Chile

[73] Assignee: Chilean Nitrate Corporation, Norfolk, Va.

[21] Appl. No.: 925,244

[22] Filed: Aug. 4, 1992

Related U.S. Application Data

[63] Continuation-in-part of Ser. No. 752,296, Aug. 30, 1991, abandoned.

[51] Int. Cl.$^5$ .............................................. B01D 9/00
[52] U.S. Cl. .................. 23/295 R; 23/313 R; 264/13; 423/505
[58] Field of Search .................. 23/295 R, 313 R; 264/13; 423/505

[56] References Cited

U.S. PATENT DOCUMENTS

| | | | |
|---|---|---|---|
| 2,214,838 | 9/1940 | Mc Gavock | 23/87 |
| 2,811,748 | 11/1957 | Smith | 18/47.2 |
| 3,056,671 | 10/1962 | Winants et al. | 71/64 |
| 3,058,159 | 10/1962 | Ishizuka et al. | 18/47.2 |
| 3,231,640 | 1/1966 | Klopf | 264/13 |
| 3,334,159 | 8/1967 | Campbell | 264/13 |
| 3,550,195 | 12/1970 | Campbell | 18/2.7 |
| 3,578,433 | 5/1971 | Bottai et al. | 71/1 |
| 4,213,924 | 7/1980 | Shirley, Jr. | 264/13 |
| 4,420,441 | 12/1983 | Singer | 264/7 |
| 4,552,566 | 11/1985 | Kita et al. | 23/313 R |
| 4,627,943 | 12/1986 | Seidler | 264/14 |
| 4,929,400 | 5/1990 | Rembaum et al. | 264/10 |
| 5,055,240 | 10/1991 | Lee et al. | 264/5 |
| 5,090,965 | 2/1992 | Kehm et al. | 23/295 R |

FOREIGN PATENT DOCUMENTS

| | | |
|---|---|---|
| 0064311 | 11/1982 | European Pat. Off. |
| 1300513 | 8/1969 | Fed. Rep. of Germany |
| 48-46593 | 7/1973 | Japan |
| 52-6672 | 2/1977 | Japan |
| 53-102291 | 9/1978 | Japan |
| 61-31304 | 2/1986 | Japan |
| 856484 | 9/1981 | U.S.S.R. |
| 981878 | 1/1965 | United Kingdom |
| 1459781 | 12/1976 | United Kingdom |

*Primary Examiner*—Gary P. Straub
*Assistant Examiner*—Timothy C. Vanoy
*Attorney, Agent, or Firm*—Pennie & Edmonds

[57] ABSTRACT

A method for fast cooling granules of low melting point, subliming substances obtained by a prilling process. The granules are in the shape of a plurality of droplets having diameters of 0.5. to 4 mm and are formed from a prilling column with the droplets partially solidified by means of a countercurrent air cooling. The partially solidified particles are received in an inert liquid in which the substance is insoluble. The liquid also has a lower boiling point than the melting point of this substance. The solidified particles are separated from the liquid before being completely cooled so that their remaining heat content evaporates any residual liquid from the particles.

9 Claims, 1 Drawing Sheet

FAST COOLING OF PARTIALLY SOLIDIFIED GRANULES OF LOW MELTING, SUBLIMING SUBSTANCES OBTAINED BY PRILLING

This is a continuation-in-part of application Ser. No. 07/752,296, filed Aug. 30, 1991, now abandoned.

BACKGROUND OF THE INVENTION

1. Field of the Invention

The present invention relates to a method for rapidly cooling low melting, subliming granules obtained in a prilling process, by immersing these granules in a liquid which is inert and in which the granules are not soluble for a controlled amount of time. The partially solidified granules are then removed from the liquid before becoming fully cooled such that their remaining heat content causes any residual liquid on the granules to evaporate.

2. Description of Prior Art

Prilling is a well known process which is extensively used in the fertilizer industry for obtaining spherically shaped granules. It can be used if it is possible to melt the material, which, in the molten condition, is discharged through nozzles or perforated plates into an enclosed space known as a prilling tower. If the temperature difference between the atmospheric air and the melt is sufficiently high, the droplets can be cooled and solidified solely with the use of a countercurrent air stream. The solid granules are generally received in a container or in a liquid in which the material is not soluble.

If the temperature of the melt is relatively low, or if the height of the prilling tower is limited, the cooling can be accelerated by using a spray nozzle located in the inside of the enclosed space, which atomizes a coolant having a boiling point lower than the melting temperature of the substance. The liquid is sprayed onto the molten droplets, which are cooled by means of the latent heat of vaporization of the liquid. This process is described in U.S. Pat. No. 4,552,566.

SUMMARY OF THE INVENTION

If the material is low melting and readily sublimes, a more effective additional cooling process can be used. This process comprises receiving the partially solidified and partially air cooled granules in an inert liquid having a lower boiling point than the melting temperature of the substance and in which the substance is not soluble, maintaining the granules within the liquid for a controlled period of time (depending on the granule size and temperature), and separating the granules from the liquid when their remaining heat content is great enough to evaporate any residual liquid on the granules. The degree of solidification of the granules has to be sufficient to resist the impact on the surface of the liquid without breaking. By this process a more rapid cooling of the granules is produced, which enables the height of the prilling tower to be reduced.

It is therefore an object of the present invention to provide a rapid method for completing the cooling of granules of a low melting, subliming substance, obtained by prilling and partially cooled and solidified by air, by keeping them immersed for a controlled time in an inert liquid in which the subliming substance is not soluble with a boiling point lower than the melting point of the substance and so providing a prilling process which permits a reduction in the height of the prilling tower.

In the process of the invention, droplets are formed by melting the low melting subliming substance and transferring it into a vessel having a bottom which is perforated with round holes or nozzles having a diameter of from about 0.5 to 4 mm. The melted droplets thus exit the vessel and enter a prilling tower through the upper central part where they are partially cooled by a countercurrent flow of air. As the substance has a low melting point, the temperature difference between the droplets and the air is not enough to completely cool the substance, unless a very high tower is used. On the other hand, because the substance readily sublimes, air cooling results in high sublimation losses, producing substantial quantities of vapors which then have to be recovered. These problems are solved by the present invention.

The partially solidified and cooled granules are received in a funnel-shaped apparatus having a cylindrical upper part and a lower discharge pipe, whose length and diameter may be varied depending upon the prilling capacity of the system. The upper diameter of the funnel is the same as or greater than that of the vessel with the perforated bottom, located at the top of the prilling tower, in order to properly capture the prills.

A flow of inert liquid, having a lower boiling point than the melting point of the subliming substance and in which the substance is not soluble, is fed into the funnel at a constant rate, equal to the rate at which the liquid leaves the funnel through the discharge pipe. It is therefore possible to maintain the liquid level inside the cylindrical upper part of the funnel at any desired constant height and at any constant temperature lower than the boiling temperature of the liquid.

A flexible screen disposed below the discharge pipe has openings smaller than the diameter of the granules. This screen is located in an inclined position, thus permitting the liquid flowing from the discharge pipe to pass easily through it. Downstream of this flexible screen is a second screen which permits complete drying of the granules.

With the use of this system, the partially solidified and cooled granules are received on the surface of the liquid inside the funnel, which softens their impact and thus avoids the destruction of the granules. The degree of solidification has to be sufficient to resist this impact on the liquid. The liquid partially cools the granules during their travel therethrough, until these granules reach the inclined flexible screen. Upon reaching the screen the reduced temperature granules are, however, still warmer than the temperature of the cooling liquid. This ensures that any residual coolant clinging to the granules after separation from the coolant stream passing through the funnel will be evaporated and will thus not remain to "contaminate" the final prill product. The granules, still hot, are separated from the liquid flow upon hitting the first screen, which is inclined at an angle sufficient to cause the granules to move away from the flow of liquid coolant and toward a second, relatively horizontal screen which serves as a collection point while permitting the droplets comprising the liquid coolant flow to pass therethrough for recycle back into the funnel. This provides sufficient time to evaporate any remaining liquid due to the residual heat content of the granules.

By means of the process described above, the prills of the subliming substance are obtained substantially without any contamination from the cooling liquid.

Although this process permits the height of the prilling tower to be shortened whatever the melting temperature of the substance may be, the greatest advantage is achieved when prilling is performed with low melting point subliming substances.

DETAILED DESCRIPTION OF THE INVENTION

Figure 1:
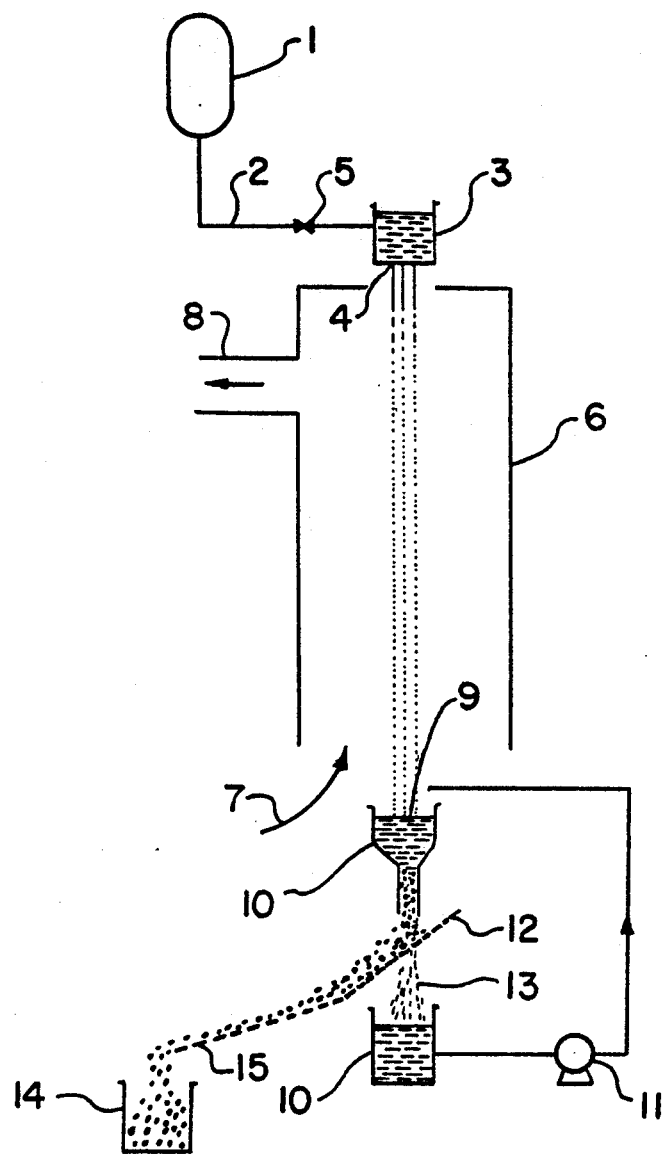
FIG. 1 is a sectional view of the apparatus of the invention.

The subliming substance is melted in a melting pot 1. Through pipe 2 the melt is introduced into vessel 3 having a perforated bottom or nozzles 4. The level of melt in the vessel 3 is held constant by valve 5, thus maintaining a constant flow through its bottom. The stream of molten substance thereafter enters prilling tower 6 through its upper central part. At a certain distance from the bottom of vessel 3, the streams are transformed into droplets which continue falling.

Air is introduced countercurrently from the lower part 7 of tower 6. The mixture of air and vapors of the subliming substance is extracted through pipe 8, and processed further for collection and recycle of said vapors.

The partially air cooled and partially solidified granules are received on the surface of liquid 9 which flows through the liquid bed of the funnel 10. The liquid surface is maintained at a constant level by means of recirculation pump 11. The granules travel through the liquid and, together with the liquid, exit through the lower end of the funnel where they land on flexible screen 12.

The process of the invention additionally comprises, moreover, carefully controlling the amount of time the granules remain in contact with the liquid stream. As noted above, the duration of this contact, which may be varied as required is dependent upon such factors as the desired size of the final granular product and the temperature of the liquid coolants as one of ordinary skill in the art would readily understand. That is, with regard to the coolant temperature, the higher its temperature the longer the granule must remain within the flow of the liquid to ensure sufficient cooling, and vice versa. Contact times used with the process of the invention thus range between 0.2 and 2 seconds It is thus an object of the present invention to minimize the duration of contact between the granules and the liquid coolant flow to the time just necessary to permit solidification of the molten droplets into solid prills. The prills thus produced, therefore, although cooled from their original molten temperature by passage through the coolant within funnel 10, still retain a substantial amount of thermal energy as they land on a flexible inclined screen 12, which is further described below. The granules "hop" or bounce upon contact with flexible screen 12. This motion serves to carry the granules out of liquid stream 13 exiting substantially perpendicularly from funnel 10, whereupon they roll down the incline and pass onto a second, substantially horizontal screen 15. They then pass to collection means such as container 14.

Prior to collection, however, any residual coolant liquid which may have adhered to the surface of the granules, e.g., due to splashing or spraying of the nearby liquid stream 13, is removed from the granules due to evaporation since, even following their removal from the coolant stream 13 although diminished in temperature, the granules remain hotter than the coolant liquid due to the rapidity of their passage through the coolant. Thus the remaining heat content and the corresponding temperature of the granules is still sufficiently higher than the temperature of the liquid (even after cooling) to evaporate any residual coolant liquid on the granules, such that these granules reach container 14 in a substantially dry condition, i.e., substantially entirely free of "contamination" by the liquid coolant.

The presently described process is, moreover, additionally advantageous in that it eliminates the need for a separate cumbersome drying step after production of the prilled product to prevent contamination by the coolant. Such separate drying steps have long been known in the prior art, despite their known propensity for negatively affecting the yield and quality of the final product when utilized with subliming substances.

Turning now to a further description of flexible inclined screen 12, it is important to note that the screen should be sufficiently inclined to facilitate movement of the prilled product away from coolant stream 13 and toward container 14, yet sufficiently horizontal to permit coolant 13 to flow through its meshed surface for recirculation by pump 11. It has been determined through experimentation therefore, that the appropriate angle of inclination for screen 12 ranges from about 20 to 50 degrees. That is, at an incline of substantially less than about 20°, the movement of the hot prills toward container 14 is less than satisfactory. Alternatively, at an inclination angle of substantially greater than about 50° the liquid coolant stream 13 "sees", in effect, a substantially solid surface and tends to bounce and splash off the wires forming the screen instead of passing through the holes in the mesh. The angle of inclination for screen 12 thus may be adjusted as desired, within the range described above, to accommodate changes in the operating conditions used with the process of the invention, such as changes in the size of the granules, the amount of liquid coolant used, its rate of flow and the like.

The advantage of the present invention is that it avoids the need for an additional liquid cooling medium usually supplied in the prior art by spraying a non-soluble inert coolant liquid into contact with the droplets, which coolant liquid does not have the same fast cooling effect made possible by introducing the partially solidified droplets directly into a liquid.

In the present invention, the direct contact procedure permits cooling and complete solidification of the granules in the fastest practical way, obtaining at the same time the particles in a dry condition. As a consequence of this fast cooling a lower prilling tower can be used, thus substantially diminishing the costs of this installation.

Moreover, this invention uses equipment having a collecting means for the granules with no moving parts, also permitting the collection of the granulated product free of cooling liquid contamination. Furthermore, the design of the collecting means minimizes breakage of the granules due to impact upon the liquid.

Hereinbelow the invention is described in more detail by way of non-limiting example.

Iodine is used as the subliming substance. Distilled water is used as the cooling liquid. It is known that iodine is only slightly soluble in water and therefore this combination is in accordance with the scope of the invention. Iodine has a melting point of 113.5° C. while water has boiling point of 100° C.

The iodine is melted in a steam jacketed tank 1 having a capacity of about 50 kg. The temperature inside the reservoir is kept at between about 113.5° and 125° C. Through pipe 2 the melt is introduced into a two liter vessel 3 having a diameter of 20 cm, the bottom of which is provided with three nozzles 4, each with a diameter of 0.9 mm. The melt level in vessel 3 is held constant at 200 mm by valve 5 to maintain a constant flow of 350 g/min per each nozzle. The streams of molten iodine enter the prilling tower 6 through the upper central part. At a certain distance from the bottom of vessel 3, these streams are transformed into droplets with a diameter of 0.5 to 4 mm, which continue falling.

Air is introduced through the open bottom 7 of tower 6 countercurrently to the direction of the droplets. The mixture of air and iodine vapors are extracted through pipe 8, and processed further for collection and recycle of the iodine.

The partially air cooled and partially solidified iodine prills are received on the surface of the water 9 flowing through funnel 10. The water flow and surface level are held constant by recirculation pump 11. The diameter of the funnel is 25 cm, the height of the cylindrical part is 20 cm and the total height is 40 cm. The granules travel through the water and out the lower end. They continue falling with the exiting stream of water 13 until they land upon screen 12. Screen 12 permits the water to flow through it while separating the granules from the stream 13. The separate granules, have a diameter of from about 0.5 to 4 mm. Any residual water is evaporated from the granules as they pass over a second screen 15 due to their remaining heat content. Thus these granules reach container 14 in a completely dry condition.

I claim:

1. A method for fast cooling of granular products of low melting, subliming substances, obtained by prilling, which comprises:

receiving partially cooled and partially solidified granular products of a low melting, subliming substance, obtained in a prilling tower, in a cooling liquid in which said granular products are substantially insoluble, said liquid having a lower boiling point than the melting point of said substances, said liquid further being kept at a substantially constant level in a funnel by equalizing its feed and discharge rates from the funnel;

passing the granules and liquid through said funnel;

controlling the residence time of said granules in said liquid such that, upon separation from a flow of said liquid discharging from said funnel, said granules retain sufficient heat such that they remain hotter than said cooling liquid, said residence time being between 0.2 and 2 seconds;

separating said granules from the liquid flow upon an inclined screen having a smaller mesh size than the diameter of said granules, said screen being inclined at an angle of between about 20 to about 50 degrees from the horizontal to facilitate movement of said granules towards means for collection thereof while permitting passage therethrough of said liquid flow, wherein the remaining heat content of said granules is sufficient to evaporate substantially any residue of said liquid upon said granules such that said granules finally are obtained substantially free of said liquid; and collecting the granules.

2. The method of claim 1 which further comprises selecting iodine as said low melting, subliming substance.

3. The method of claim 1 which further comprises forming said granular products with a diameter of from about 0.5 to 4 mm.

4. The method of claim 1 which further comprises selecting water as said cooling liquid.

5. The method of claim 1 which further comprises subjecting said granular products during prilling to a countercurrent flow of air to partially cool and partially solidify said products prior to receiving them in said cooling liquid.

6. The method of claim 1 which further comprises adjusting the temperature of said liquid to a substantially constant temperature lower than the boiling temperature of said liquid.

7. The process of claim 1 wherein the duration of contact between the granules and the flow of liquid coolant is increased as the temperature of said liquid is raised.

8. The method of claim 1 which further comprises directing said separated granules to a second, relatively substantially horizontal screen, downstream of said inclined screen, whereupon said granules are permitted to substantially dry prior to collection.

9. The process of claim 1 which further comprises collecting and recycling vapors produced by said subliming substances within said prilling tower for further processing.

* * * * *